(12) United States Patent
Haimerl

(10) Patent No.: US 10,449,842 B2
(45) Date of Patent: Oct. 22, 2019

(54) TOP OF A CONVERTIBLE VEHICLE HAVING AN UNFOLDABLE HEADLINER

(71) Applicant: Webasto SE, Stockdorf (DE)

(72) Inventor: Alexander Haimerl, Stockdorf (DE)

(73) Assignee: WEBASTO SE, Stockdorf (DE)

( * ) Notice: Subject to any disclaimer, the term of this patent is extended or adjusted under 35 U.S.C. 154(b) by 0 days.

(21) Appl. No.: 15/878,590

(22) Filed: Jan. 24, 2018

(65) Prior Publication Data
US 2018/0236852 A1 Aug. 23, 2018

(30) Foreign Application Priority Data
Feb. 2, 2017 (DE) .......................... 10 2017 102 058

(51) Int. Cl.
*B60J 7/12* (2006.01)
*B60J 7/00* (2006.01)

(52) U.S. Cl.
CPC ............ *B60J 7/0023* (2013.01); *B60J 7/1226* (2013.01); *B60J 7/1252* (2013.01)

(58) Field of Classification Search
CPC ....... B60J 7/0023; B60J 7/1252; B60J 7/1226
USPC .................. 296/214, 107.06, 107.11, 107.12
See application file for complete search history.

(56) References Cited

U.S. PATENT DOCUMENTS

| | | | |
|---|---|---|---|
| 8,235,448 B2 * | 8/2012 | Richter | B60J 7/143 296/107.06 |
| 2005/0029833 A1 * | 2/2005 | Obendiek | B60J 7/146 296/108 |

* cited by examiner

*Primary Examiner* — Dennis H Pedder
(74) *Attorney, Agent, or Firm* — Fitch, Even, Tabin & Flannery, LLP

(57) ABSTRACT

A top of a convertible vehicle having a top linkage displaceable between a closed position, in which the top covers a vehicle interior, and a storage position, in which the vehicle interior is open toward the sky, and which has a linkage arrangement on either side of a vertical longitudinal center plane of the top, the linkage arrangement being covered by a headliner when in the closed position. A fabric deflecting element for the headliner is attached to each of the linkage arrangements, the fabric deflecting element moving relative to a roof side rail when the top linkage is being displaced between the closed position and the storage position, an edge of the headliner being attached to the roof side rail. The headliner slides on a fabric contact surface of the fabric deflecting element when the top linkage is being displaced between the storage position and the closed position.

10 Claims, 7 Drawing Sheets

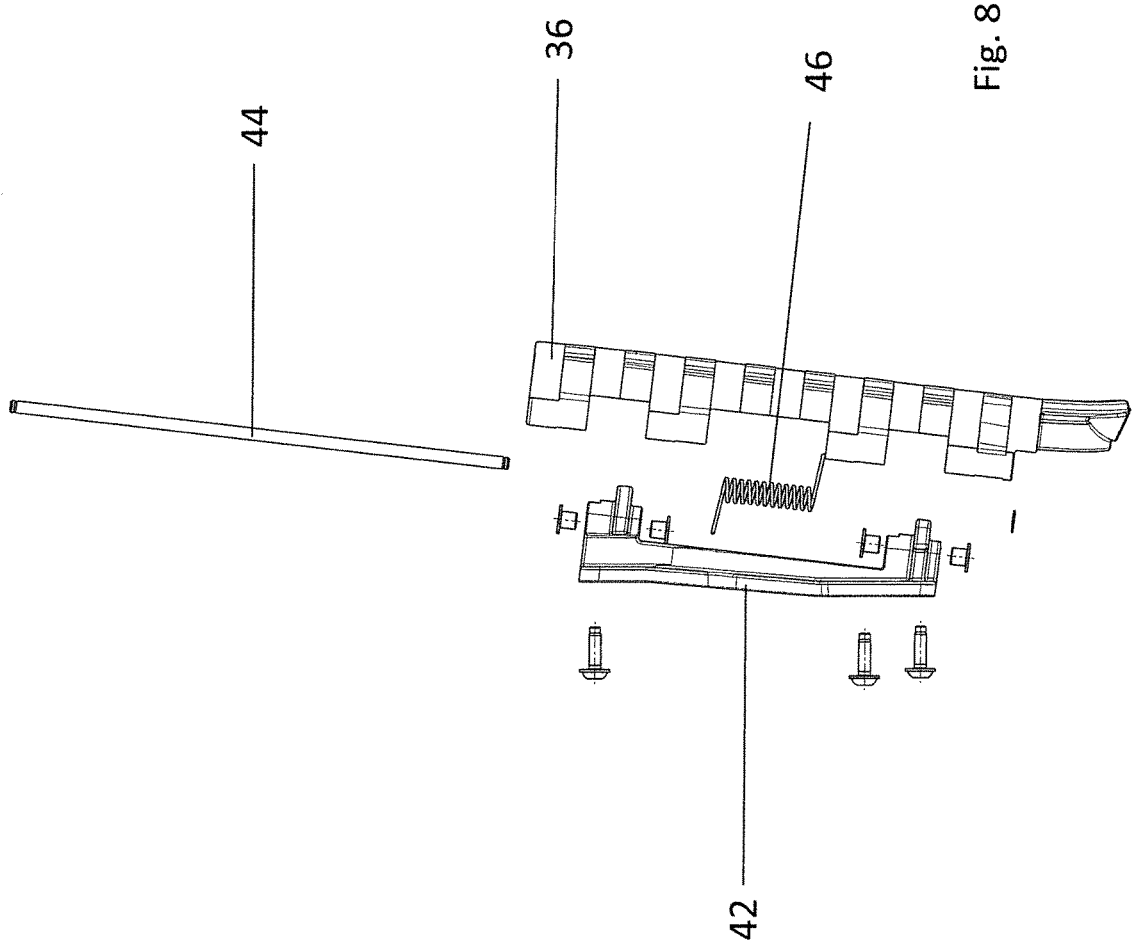

TOP OF A CONVERTIBLE VEHICLE HAVING AN UNFOLDABLE HEADLINER

CROSS-REFERENCE TO RELATED APPLICATIONS

This application claims priority from German Patent Application Number DE 10 2017 102 058.6, filed Feb. 2, 2017, which is hereby incorporated herein by reference in its entirety for all purposes.

FIELD

The invention relates to a top of a convertible vehicle having the features of the preamble of claim 1.

BACKGROUND

A top of this kind is known from practice and comprises a top linkage which can be displaced between a closed position, in which the top covers a vehicle interior, and a storage position, in which the vehicle interior is open toward the sky. If the top is a soft top, the top linkage serves to unfold and to store a flexible and foldable top cover. If the top is a retractable hard top, the top linkage serves to displace and shift rigid roof shells which are disposed on behind the other in a flush manner when in the closed position and are stored one on top of the other in a rear-side top storage box when in the storage position. The top linkage comprises a linkage arrangement on either side of a vertical longitudinal center plane of the top. Additionally, a headliner is usually provided, which covers the two laterally disposed linkage arrangements when the top linkage is in the closed position and which forms the surface of the top that is visible from the vehicle interior.

The headliner can be installed in different ways. For example, rigid lining parts are provided which are screwed to the top linkage. A headliner fabric can then be attached directly to the lining parts or can cover the lining parts.

Alternatively, it is conceivable for the headliner or the headliner fabric to have reinforcing and/or shaping elements on its side facing away from the vehicle interior, said elements being positioned using straps or cords when the top is being displaced into the closed position. The portion of the headliner reinforced by the reinforcing and/or shaping elements covers the linkage arrangements from below. In particular, reinforced headliner portions of this kind each extend from a weather strip of a top side frame, the weather strip being disposed on a respective lateral edge, in the direction of a longitudinal center plane of the top, thus being provided on the bottom side of the respective linkage arrangement. The headliner is not connected to the weather strip or to the weather-strip support or to any other component rigidly connected to the weather strip. Instead, the reinforced headliner portion, which is adjacent to the weather strip when the top is in the closed position, is displaced between the storage position and the closed position by means of the straps or cords.

It is further known for the headliner to be provided with panels or flaps that cover the linkage arrangements when the top is in the closed position. When the top is being displaced from the closed position into the storage position, the panels or flaps undergo a pivoting movement, which frees an area below the top linkage for the pivoting movement of the respective linkage arrangement.

However, the solutions available so far for connecting a headliner to a top have disadvantages. Lining parts permanently mounted to the top linkage may not allow for the required pivoting movements of the top linkage. Reinforced headliner portions which are positioned by means of cords or straps allow for only limited control of intermediate positions. Under certain conditions, such as wind impact, during top movement while the vehicle in question is in motion and the like, this may result in incorrect positions, which, in turn, may cause damage to the top. Moreover, installation of the straps or cords is intricate and complex. Hence, there is the risk of installation mistakes, which may lead to damage to the top. Furthermore, it is not ensured that the headliner takes up a true-to-position position relative to the respective lateral weather strip because control by means of the straps or cords does not allow for unambiguous guiding. In the version comprising swinging panels or flaps, sufficient installation space has to be provided in the storage position of the top, which, however, is often impossible because of the respective vehicle geometry.

SUMMARY

The object of the invention is to provide a top of the kind mentioned above in which the headliner can be guided in a controlled manner to follow the movement of displacement of the top linkage when the top linkage is being displaced between the storage position and the closed position.

According to the invention, this object is attained by the top having the features of claim 1.

Thus, according to the invention, fabric deflecting elements for the headliner are attached to the linkage arrangements of the top linkage, the headliner sliding across said fabric deflecting elements when the top linkage is being displaced. The fabric deflecting elements, via which the headliner runs in particular when the top linkage is in the closed position, shape the fabric of the headliner; this means that since the headliner covers the fabric deflecting elements when the top linkage is in the closed position, the fabric deflecting elements determine the path or run of the headliner fabric. The headliner, i.e. the fabric of the headliner, simply covers the fabric deflecting elements, meaning it is not attached to them, which allows the headliner fabric to slide across the fabric deflecting elements during displacement of the top linkage and its associated relative movement between the roof side rails, to which the headliner is attached, and the fabric deflecting elements. The sliding movement is necessary in order to avoid overstretching in the fabric of the headliner during displacement of the top linkage. This leads to additional options for the available installation spaces during the movement of the top. Thus, there is additional freedom regarding the design of top kinematics.

In a preferred embodiment of the top according to the invention, the sliding movement of the headliner on the fabric deflecting surfaces of the fabric deflecting elements is controlled by means of at least one pulling means each, which is attached to the headliner on one side and to the top linkage on the other side. Owing to the guiding, which is provided by the fabric deflecting elements for the headliner, only few pulling means are required to control the sliding movement. Each of the pulling means can be formed by a cable, a strap or the like.

In order for the headliner to slide across the respective fabric deflecting element in a defined manner and to be tensioned into a defined position, a guide for the respective pulling means is preferably provided. In a specific embodiment, when a cable is used as the pulling means, the guide is formed by a guide hole or by a guide eyelet or deflecting eyelet. The guide hole can be incorporated directly into the fabric deflecting element or be formed by an eyelet connected to the fabric deflecting element.

The fabric deflecting element on which the headliner slides when the top linkage is being displaced allows the headliner or the fabric of the headliner to be attached to a weather-strip support of a roof side rail and to thus always take up a defined position relative to the weather strip or weather-strip support. The roof side rail to which the edge of the headliner is attached can also be formed by a fixing bracket of a main column on which a weather strip is disposed. In this way, a pleasant appearance of the top according to the invention can be realized in the area of the weather strip.

In principle, the fabric deflecting elements can each be attached to any component of the top linkage that moves relative to the roof side rail and thus to the headliner when the top linkage is being displaced between the closed position and the storage position. In a specific embodiment of the top according to the invention, however, the fabric deflecting elements are each attached to a main link of the respective linkage arrangement, the fabric deflecting elements thus guiding in particular a fabric portion that is connected to a main column or C-column of the top.

For example, with respect to their longitudinal extension, the fabric deflecting elements each at least approximately follow the path or run of a link of the respective linkage arrangement to which they are attached. This means that if the fabric deflecting elements are each attached to a main link, their path or run substantially follows the path or run of said main link in their longitudinal direction.

In order to prevent the fabric deflecting elements from being in the way of movement of a link of the linkage arrangements when the top linkage is being displaced, the fabric deflecting elements can each be attached to the respective linkage arrangement via an articulation. Preferably, the fabric deflecting elements will then pivot about the axis of the articulation when the top linkage is pivoted.

In order to clearly define a functional position of the pivotable fabric deflecting elements in which the headliner is tensioned and the top thus takes up its closed position, they can each be pre-loaded by means of a spring or return spring which acts in the direction of the functional position.

In order to be able to pivot the fabric deflecting elements out of the end position or functional position defined by means of the spring, they can each interact with an actuating element. Each actuating element can be formed by a link of the top linkage, by a cable or the like. In a specific embodiment, an in particular enlarged stop surface of a link of the top linkage drives against the respective fabric deflecting element during displacement from the closed position into the storage position, the fabric deflecting element thus being pivoted against the force of the spring or return spring. During displacement of the top into the closed position, the fabric deflecting elements automatically swing back into the functional position by the action of the springs.

The fabric contact surfaces of the fabric deflecting elements, which are in particular made of plastic injection-molded parts, are preferably each curved. The curvature defines a path or run of the fabric of the headliner when in the closed position.

Other advantages and advantageous embodiments of the subject-matter of the invention are apparent from the description, the drawing and the claims.

An embodiment example of a top according to the invention is illustrated in a schematically simplified manner in the drawing and is explained in more detail in the following description.

BRIEF DESCRIPTION OF THE DRAWINGS

FIG. 8 shows a fabric deflecting element of the top linkage in a disassembled state.

DETAILED DESCRIPTION

Figure 1:
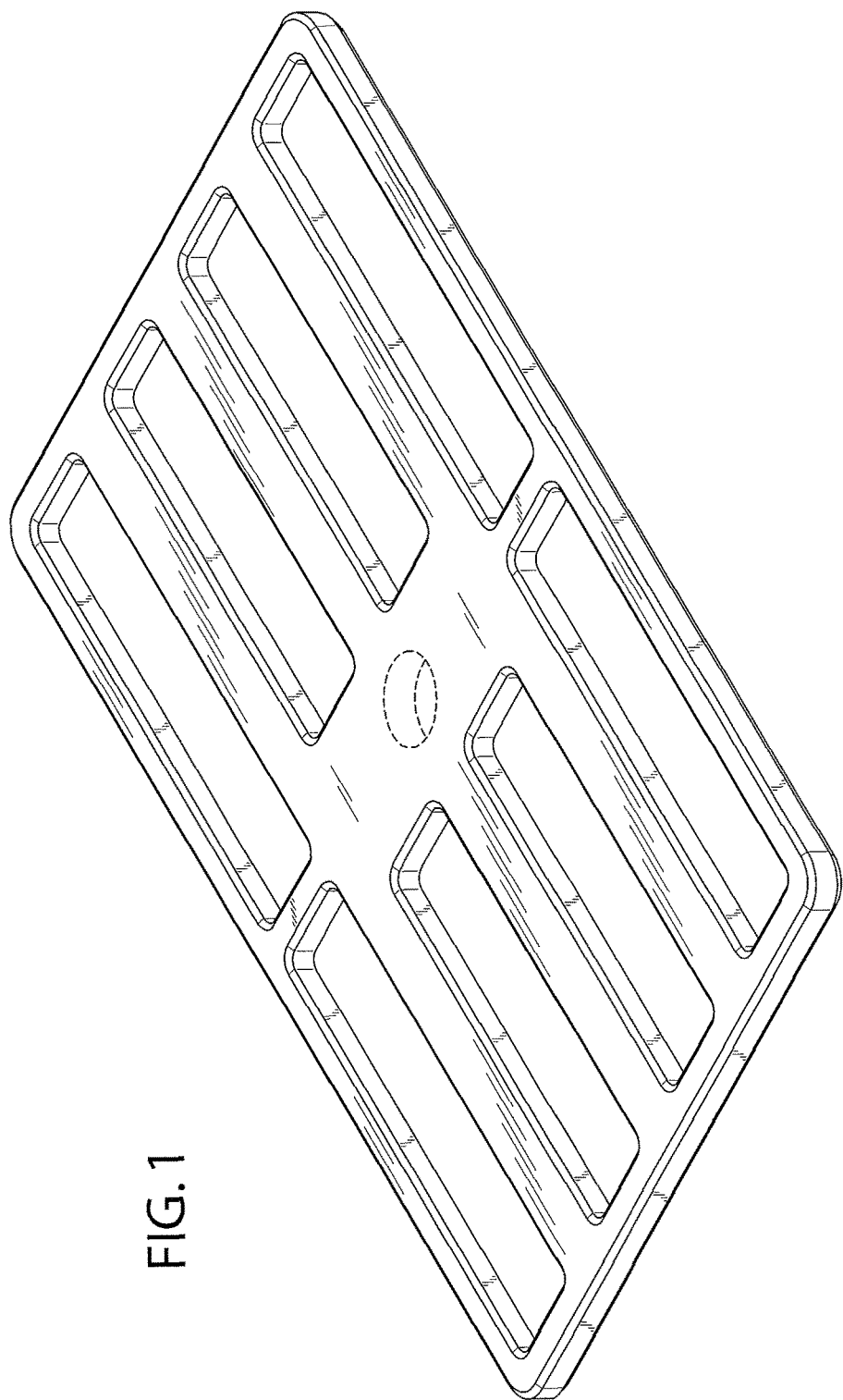
FIG. 1 shows a perspective view of a top according to the invention, being a folding top, in its closed position.

The drawing shows a top 10, formed in the manner of a folding top, of a convertible vehicle not illustrated in more detail otherwise. The top 10 comprises a top linkage 12 which has a linkage arrangement 14 on either side of a vertical longitudinal center plane of the top, each linkage arrangement 14 being pivotably mounted on a vehicle-mounted main bearing 16. The top linkage 12 serves to unfold a foldable and flexible top cover 18, which is made of a weather-proof fabric. In its rear-side area, the top cover 18 has a cutout 20, in which a rear window 22 is provided.

The top linkage 12 is mirror-symmetric with respect to a vertical longitudinal center plane of the top. Hence, the top will be described below with reference to only the linkage arrangement disposed on the left side with respect to the forward direction of travel of the vehicle in question. The linkage arrangement disposed on the right side with respect to the forward direction of travel of the vehicle is analogous thereto.

Figure 2:
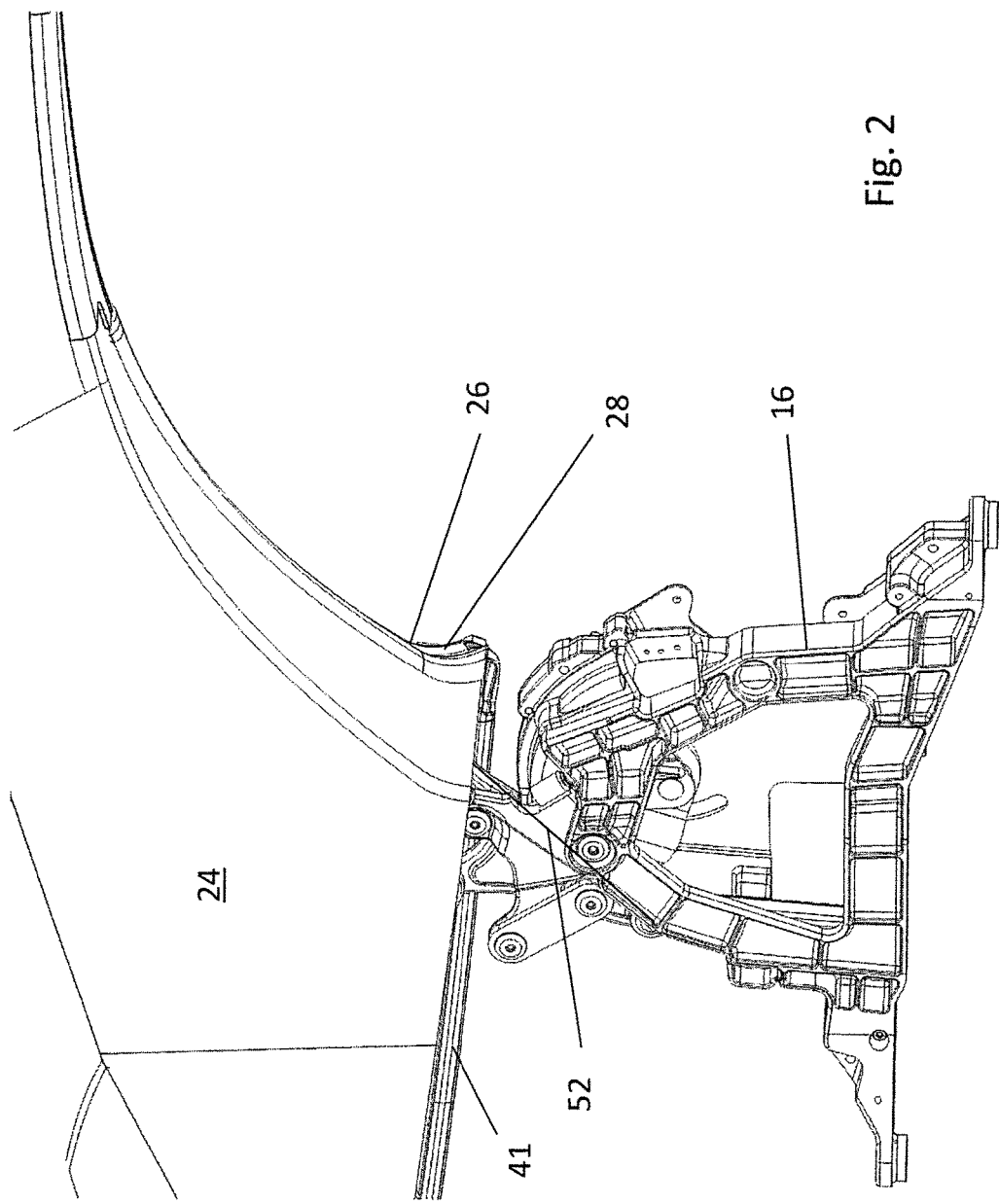
FIG. 2 shows a perspective interior view of the top in a rear-side corner area.

Furthermore, the top 10 comprises a headliner 24, illustrated in FIG. 2, which is made of a flexible fabric and forms the inner visible surface of the top 10 facing the vehicle interior when in its closed position. In the closed position of the top 10, the headliner 24 covers the underside of the linkage arrangements 14 disposed on both sides.

The lateral edge 26 of the headliner 24, which extends in the longitudinal direction of the top and in the transverse direction of the top, is attached to a fixing rail 28, which is attached to a main column 30, which, together with a main link 32, forms a main multi-joint link mechanism of the respective linkage arrangement 14. The headliner 24 is connected to the fixing rail 28 across as long a portion as possible of the fixing rail 28. In the case at hand, the headliner 24 is connected to the fixing rail 28 across about 40% of the length. Depending on the application, the headliner 24 can also be connected to the fixing rail 28 across a length of up to 100% of the length of the fixing rail 28.

The main column 30 and the main link 32 are pivotably mounted on the respective main bearing 16 and, together with the main bearing 16 and a roof frame element 34, form the main multi-joint link mechanism.

Parallel, at least in the broadest sense, to the fixing rail 28, which also constitutes a weather-strip support and forms a termination and boundary of the headliner 24, a fabric deflecting element 36 is attached to the main link 32, said fabric deflecting element 36 forming a fabric contact surface for the headliner 24 at least when the top 12 is in the closed position, and the headliner 24 being guided across said fabric deflecting means 36 starting from the fixing rail 28 in the direction of the vertical longitudinal center plane of the top. For this purpose, the fabric deflecting element 36 has a fabric contact surface 38, which is curved and defines the path or run of the fabric of the headliner 24 when the top 12 is in the closed position.

Figure 3:
FIG. 3 shows a view corresponding to FIG. 2, but without illustration of a headliner, showing only a top linkage.
Figure 4:
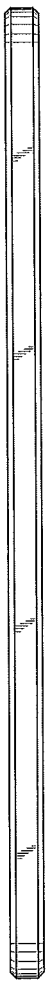
FIG. 4 shows an enlarged view of area IV in FIG. 3.
Figure 5:
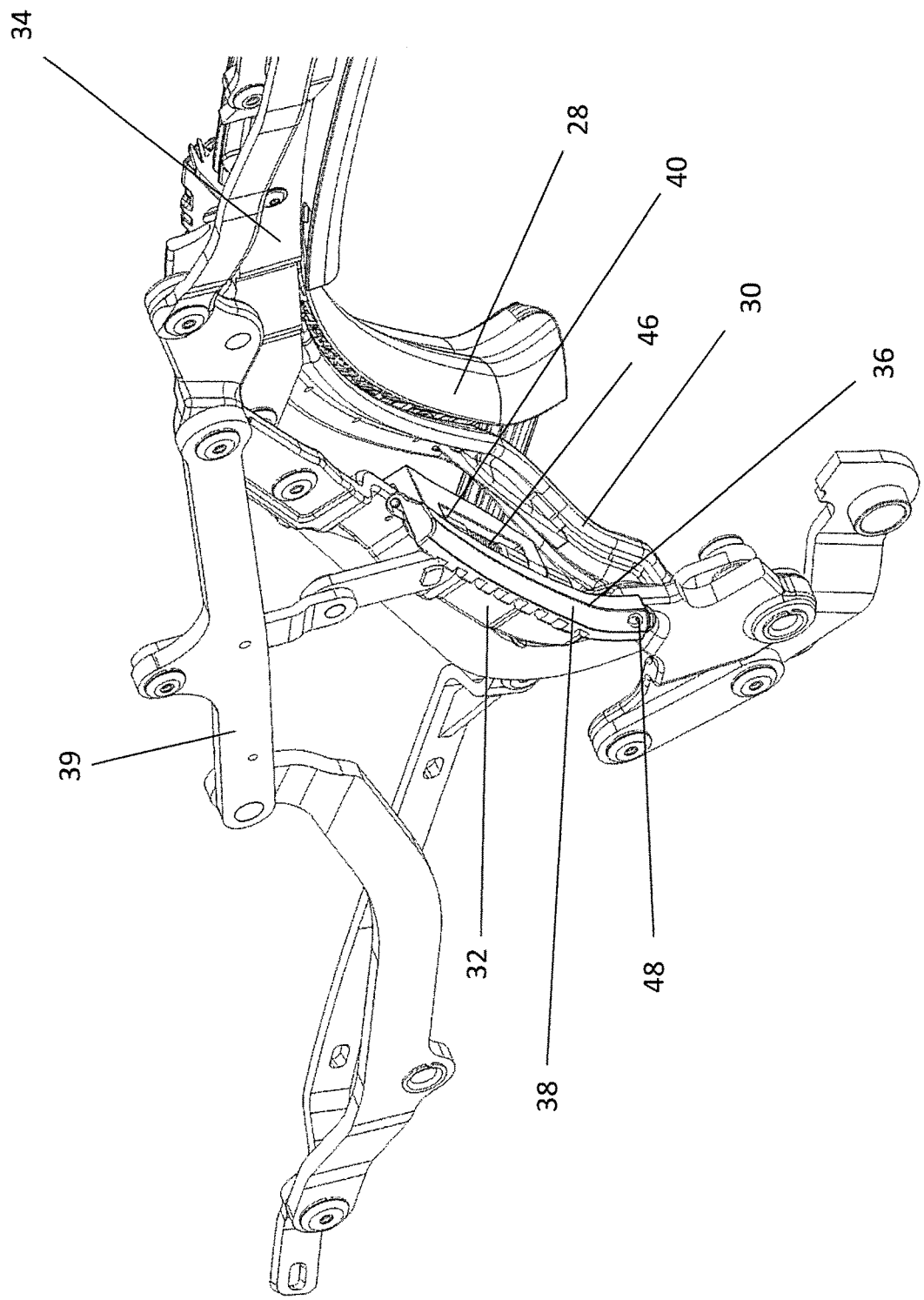
FIG. 5 shows another perspective view of the top linkage in a rear-side corner area in the closed position of the top.
Figure 6:
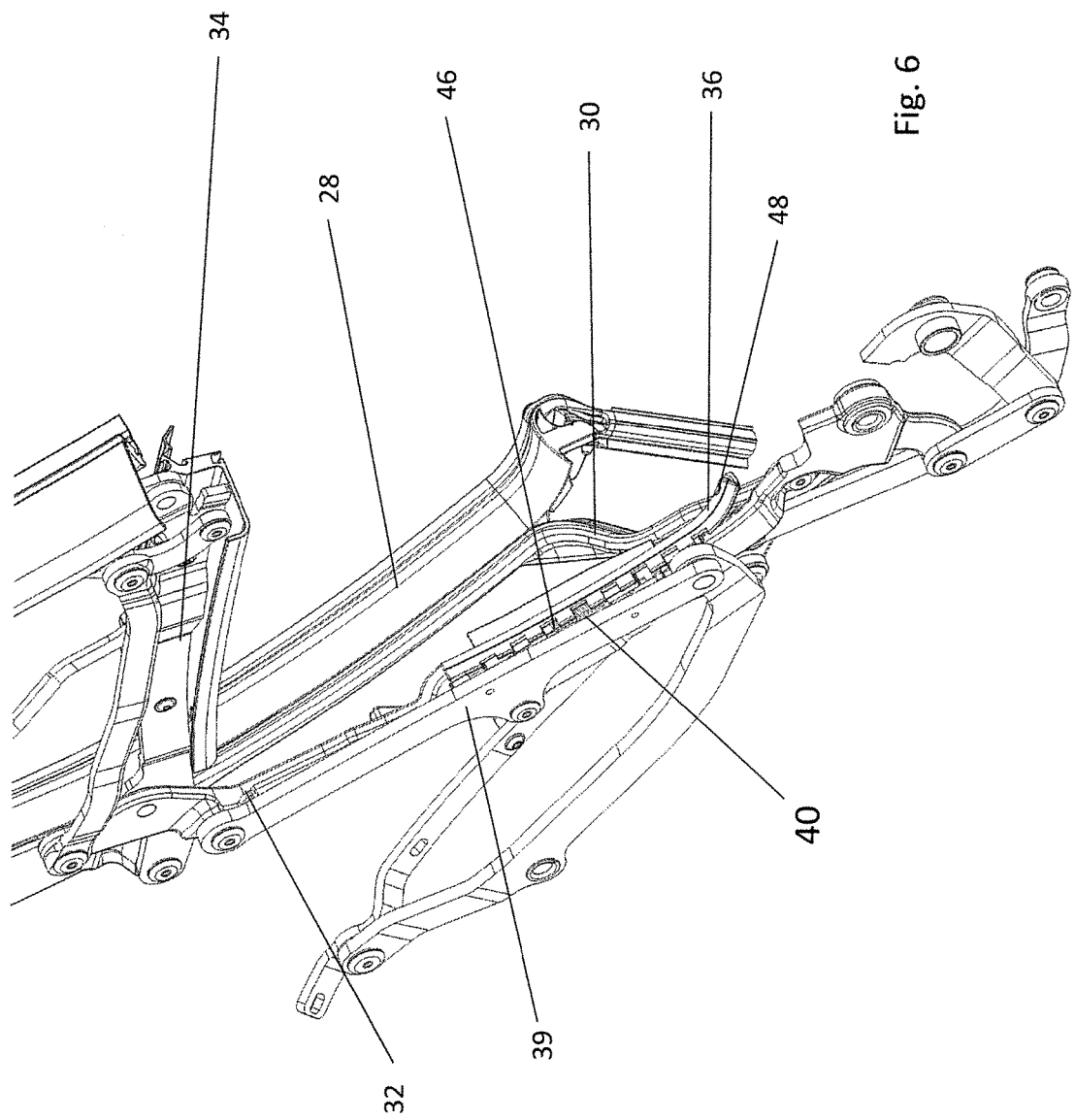
FIG. 6 shows a view corresponding to FIG. 5, but in an intermediate position during displacement of the top.
Figure 7:
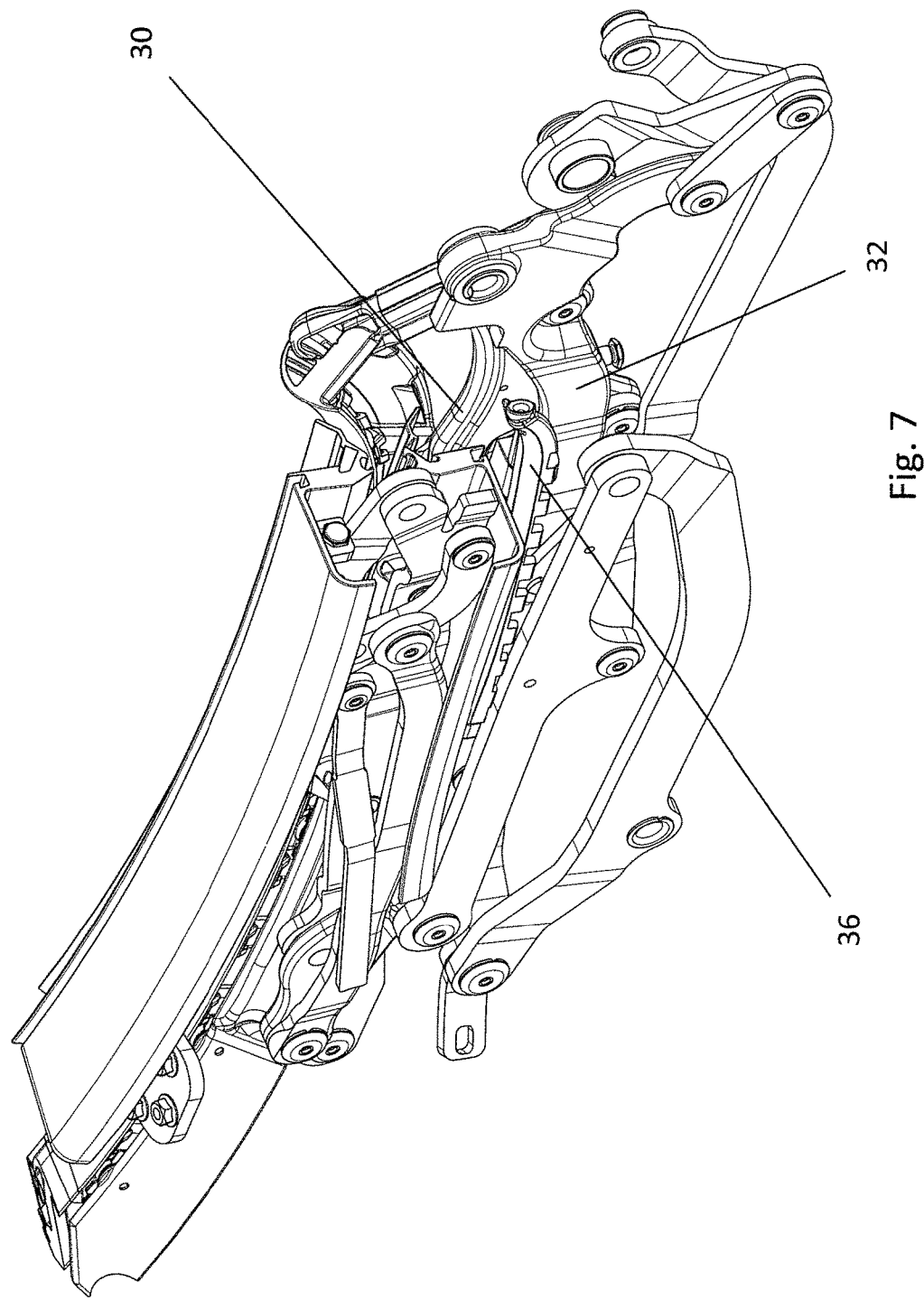
FIG. 7 shows a view also corresponding to FIG. 5, but in the storage position of the top.

The fabric deflecting element 36 is pivotably mounted on the main link 32 via an articulation 40. To this end, a bearing pedestal 42, which is illustrated in FIG. 8, is attached to the main link 32, said bearing pedestal 42 being connected to the fabric deflecting element 36 via a bearing pin 44, the fabric deflecting element 36 thus being pivotable about the axis formed by the bearing pin 44 between a functional position, in which the headliner 24 is tensioned (FIGS. 3, 4, 5), and a displacement position, in which all links of the top linkage 12 can pass the fabric deflecting element 36 (FIGS. 6,7).

In order to define the functional position of the fabric deflecting element 36, a spring 46 acting as a return spring is provided, whose legs rest on the bearing pedestal 42 on one side and on the fabric deflecting element 36 on the other side and which pre-loads the latter into an inwardly pivoted functional position in which the fabric deflecting element 36 is in contact with the front side (with respect to the orientation of the top) of the main link 32. This means that the spring 46 holds the fabric deflecting element 36 in its functional position, illustrated in FIGS. 3, 4 and 5, in which the fabric of the headliner 24 is in contact with the fabric contact surface 38. In order to pivot the fabric deflecting element 36 into its displacement position, in which it is in lateral contact with the main link 32 (FIGS. 6, 7), a link of the top linkage, which is a tensioning rod 39 for a tensioning bow 41 in the case at hand, drives against the fabric deflecting element 36 with a displacement surface, the fabric deflecting element 36 thus being pivoted into its displacement position against the force of the spring 45. The displacement surface is formed by an optionally thickened portion of the tensioning rod 39 or by an accessory part of the tensioning rod 39.

A guide hole 48 for a cable 52 is formed in the fabric deflecting element 36, the cable 52 being attached to the top linkage 12 or to the main bearing 16 on one side and to the headliner 24 on the other side. When the top linkage 12 is being displaced into storage position, the tension of the cable 52 is released, allowing the headliner 24 to slide across the fabric deflecting element 36. When the top linkage 12 is being displaced into the closed position, the headliner 24 is tensioned via the cable 52.

The headliner 24 is permanently connected to the fixing rail 28. Thus, a sliding movement of the headliner 24 on the fabric deflecting element, which also forms a sliding element for the headliner 24, can be easily controlled during displacement of the top linkage 12 between the closed position and the storage position. The sliding movement is controlled by means of at least one pulling means, in particular by means of the cable 52, which is attached to the headliner 24 at one side and to the top linkage 12 or the main bearing 16 on the other side. The pulling means pulls the headliner 24 into the position associated with the closed position of the top (cf. FIG. 2), wherein it is guided by the guide hole 48 of the fabric deflecting element 36. Thus, the headliner 24 can be pulled into position, i.e. slide across the fabric deflecting element 36, in a defined manner. The fabric deflecting element 36 can be of a very narrow design so that there are no package issues due to lack of installation space when the top linkage is stored. By having the headliner 24 slide on the fabric deflecting element 36, overstretching in the fabric of the headliner 24 can be avoided.

REFERENCE SIGNS

10 top
12 top linkage
14 linkage arrangement
16 main bearing
18 top cover
20 cutout
22 rear window
24 headliner
26 edge
28 fixing rail
30 main column
32 main link
34 roof link
36 fabric deflecting element
38 fabric contact surface
39 tensioning rod
40 articulation
41 tensioning bow
42 bearing pedestal
44 bearing pin
46 spring
48 guide hole
52 cable

The invention claimed is:

1. A top of a convertible vehicle, comprising:
a top linkage which can be displaced between a closed position, in which the top covers a vehicle interior, and a storage position, in which the vehicle interior is open toward the sky, and which has a link-age arrangement on either side of a vertical longitudinal center plane of the top, the linkage arrangement being covered by a headliner when in the closed position,
wherein a fabric deflecting element for the headliner is attached to each of the linkage arrangements, the fabric deflecting element moving relative to a roof side rail when the top linkage is being displaced between the closed position and the storage position, an edge of the headliner being attached to the roof side rail,
wherein the headliner slides on a fabric contact surface of the fabric deflecting element when the top linkage is being displaced between the storage position and the closed position; and
wherein each fabric deflecting element is attached to the respective linkage arrangement via an articulation.

2. The top according to claim 1, wherein a sliding movement of the headliner on the fabric contact surfaces of the fabric deflecting elements is controlled by means of a respective pulling means which is attached to the headliner on one side and to the top linkage on the other side.

3. The top according to claim 1, wherein the edge of the headliner is attached to a roof side rail which constitutes a weather strip support portion.

4. The top according to claim 1, wherein each fabric deflecting element is attached to a main link of the respective linkage arrangement.

5. The top according to claim 1, wherein, in its longitudinal extension, each fabric deflecting element at least approximately follows the path or run of a link of the respective linkage arrangement to which it is attached.

6. The top according to claim 1, wherein each fabric deflecting element is pre-loaded into an end position by means of a spring.

7. A top of a convertible vehicle, comprising: a top linkage which can be displaced between a closed position, in which the top covers a vehicle interior, and a storage position, in which the vehicle interior is open toward the sky, and which has a link-age arrangement on either side of a vertical longitudinal center plane of the top, the linkage arrangement being covered by a headliner when in the closed position, wherein a fabric deflecting element for the headliner is attached to each of the linkage arrangements, the fabric deflecting element moving relative to a roof side rail when the top linkage is being displaced between the closed position and the storage position, an edge of the headliner being attached to the roof side rail, and wherein the headliner slides on a fabric contact surface of the fabric deflecting element when the top linkage is being displaced between the storage position and the closed position, wherein each fabric deflecting element has a guide hole or a deflecting eyelet for a cable or rope.

8. The top according to claim 1, wherein the fabric contact surfaces of the fabric deflecting elements are each curved and define a path or run of the fabric of the headliner when the top is in the closed position.

9. The top according to claim 2, wherein the pulling means is selected from the group consisting of a cable, a rope and a strap.

10. The top according to claim 7, wherein each fabric deflecting element guide hole or deflecting eyelet serves to unfold the headliner.

\* \* \* \* \*